(12) United States Patent
Wu

(10) Patent No.: US 8,760,793 B1
(45) Date of Patent: Jun. 24, 2014

(54) WRITING IN HARD DISK DRIVES

(75) Inventor: Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 163 days.

(21) Appl. No.: 13/409,996

(22) Filed: Mar. 1, 2012

Related U.S. Application Data

(60) Provisional application No. 61/450,063, filed on Mar. 7, 2011.

(51) Int. Cl.
*G11B 5/58* (2006.01)
*G11B 27/36* (2006.01)

(52) U.S. Cl.
USPC ......................................... 360/77.01; 360/31

(58) Field of Classification Search
USPC ........ 369/44.27, 44.26, 44.28, 44.32; 360/75, 360/78.14, 31, 77.08, 78.04, 51, 53, 77.01, 360/58
See application file for complete search history.

(56) References Cited

U.S. PATENT DOCUMENTS

| | | | | |
|---|---|---|---|---|
| 6,714,376 | B1 * | 3/2004 | Brunnett et al. | 360/75 |
| 8,498,071 | B2 * | 7/2013 | Grundvig et al. | 360/31 |
| 2001/0040755 | A1 * | 11/2001 | Szita | 360/78.14 |
| 2002/0184466 | A1 * | 12/2002 | Gay Sam et al. | 711/202 |

* cited by examiner

*Primary Examiner* — Nabil Hindi

(57) ABSTRACT

Embodiments provide a method for a method comprising causing data to be written on a first track located on a disk; while writing the data on the first track, buffering, in a buffer module, the data; determining that while writing the data on at least a portion of the first track, a portion of a write head was offset with respect to the first track, such that at least the portion of the write head infringed on a second track; determining a direction of movement of the write head; and based on determining that the portion of the write head was offset and determining the direction of movement of the write head, selectively performing one of (i) using the data buffered in the buffer module to recover data of the second track, or (ii) discarding the data buffered in the buffer module.

18 Claims, 8 Drawing Sheets

WRITING IN HARD DISK DRIVES

CROSS-REFERENCES TO RELATED APPLICATIONS

The present disclosure claims priority to U.S. Provisional Patent Application No. 61/450,063 filed Mar. 7, 2011, the entire disclosure of which is hereby incorporated by reference in its entirety except for those sections, if any, that are inconsistent with this disclosure.

TECHNICAL FIELD

Embodiments of the present disclosure relate to the field of hard disk drives, and more particularly, to write operations in hard disk drives.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A hard disk drive is a common digital data storage device. A hard disk drive usually has a plurality of concentric tracks located on a surface of a disk. A write head writes data on the plurality of tracks, and a read head reads data from the plurality of tracks. Before writing data on a first track, it may take some time to substantially align the write head to the first track. If the alignment of the write head is not proper or if data is written on the first track before proper alignment of the write head, data in a neighboring second track (e.g., which is adjacent to the first track) may become corrupted due to the misalignment of the write head (e.g., while the misaligned write head writes data on the first track). Such corrupted data in the second track, for example, may create problem while the read head tries to read data from the second track.

In a conventional hard disk drive, width of the tracks can be made larger to reduce the time it takes for the write head to be aligned to a track, while writing data on the track. However, this results in a decrease of a storage density of the conventional hard disk drive.

In another conventional hard disk drive, the write head starts writing data on a track only after verifying that the write head is substantially aligned to the track on which data is to be written. However, in such a conventional hard disk drive, speed of writing data is affected (as the write head writes data only after such verification).

SUMMARY

In various embodiments, there is provided a method comprising causing data to be written on a first track located on a disk; while writing the data on the first track, buffering, in a buffer module, the data; determining that while writing the data on at least a portion of the first track, a portion of a write head was offset with respect to the first track, such that at least the portion of the write head infringed on a second track; determining a direction of movement of the write head; and based on determining that the portion of the write head was offset and determining the direction of movement of the write head, selectively performing one of (i) using the data buffered in the buffer module to recover data of the second track, or (ii) discarding the data buffered in the buffer module. The data to be written on the first track is first data, and wherein the method further comprises based on determining the direction of movement of the write head, determining that the write head is not scheduled to write on the second track subsequent to writing the first data on the first track; and based on determining that the write head is not scheduled to write on the second track subsequent to writing the first data on the first track, reading second data from the second track, based on the first data and the second data, generating third data, and writing the third data on the second track.

In an embodiment, there is also provided a control module comprising a buffer module, wherein based on a write head writing data on a first track of a disk, the buffer module is configured to buffer the data; a servo module configured to determine that while writing the data on at least a portion of the first track, a portion of the write head was offset with respect to the first track, such that at least the portion of the write head infringed on a second track of the disk, wherein the servo module is further configured to determine a direction of movement of the write head; and a data recovery module configured to, based on the direction of movement of the write head, selectively perform one of (i) using the data buffered in the buffer module to recover data of the second track, or (ii) discarding the data buffered in the buffer module. The data written on the first track is first data, and wherein the data recovery module is further configured to based on the direction of movement of the write head, determine that the write head is not scheduled to write on the second track subsequent to writing the first data on the first track; based on determining that the write head is not scheduled to write on the second track subsequent to writing the first data on the first track, read second data from the second track; based on the first data and the second data, generate third data; and write the third data on the second track.

In an embodiment, there is also provided a method comprising aiming to align a write head with a first track for writing data on the first track of a disk, wherein the first track has a track center, wherein a second track of the disk is adjacent to the first track; and determining that the second track is scheduled to be written on subsequent to writing on the first track, wherein aiming to align the write head further comprises based on the determining, aiming to align the write head with respect to a modified track center of the first track.

In an embodiment, there is also provided a method comprising causing first data to be written on a first track located on a disk; while writing the first data on the first track, buffering, in a buffer module, the first data; determining that while writing the first data on at least a portion of the first track, a portion of a write head infringed on a second track located on the disk, wherein the second track stored second data prior to writing the first data on the first track, wherein the second track stored third data subsequent to writing the first data on the first track, and wherein the third data is generated by corruption of the second data due to the portion of the write head infringing on the second track; in response to determining that the portion of the write head infringed on the second track: reading the third data from the second track, and recovering the second data from the third data and the first data buffered in the buffer module, to generate recovered second data.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION

Figure 1:
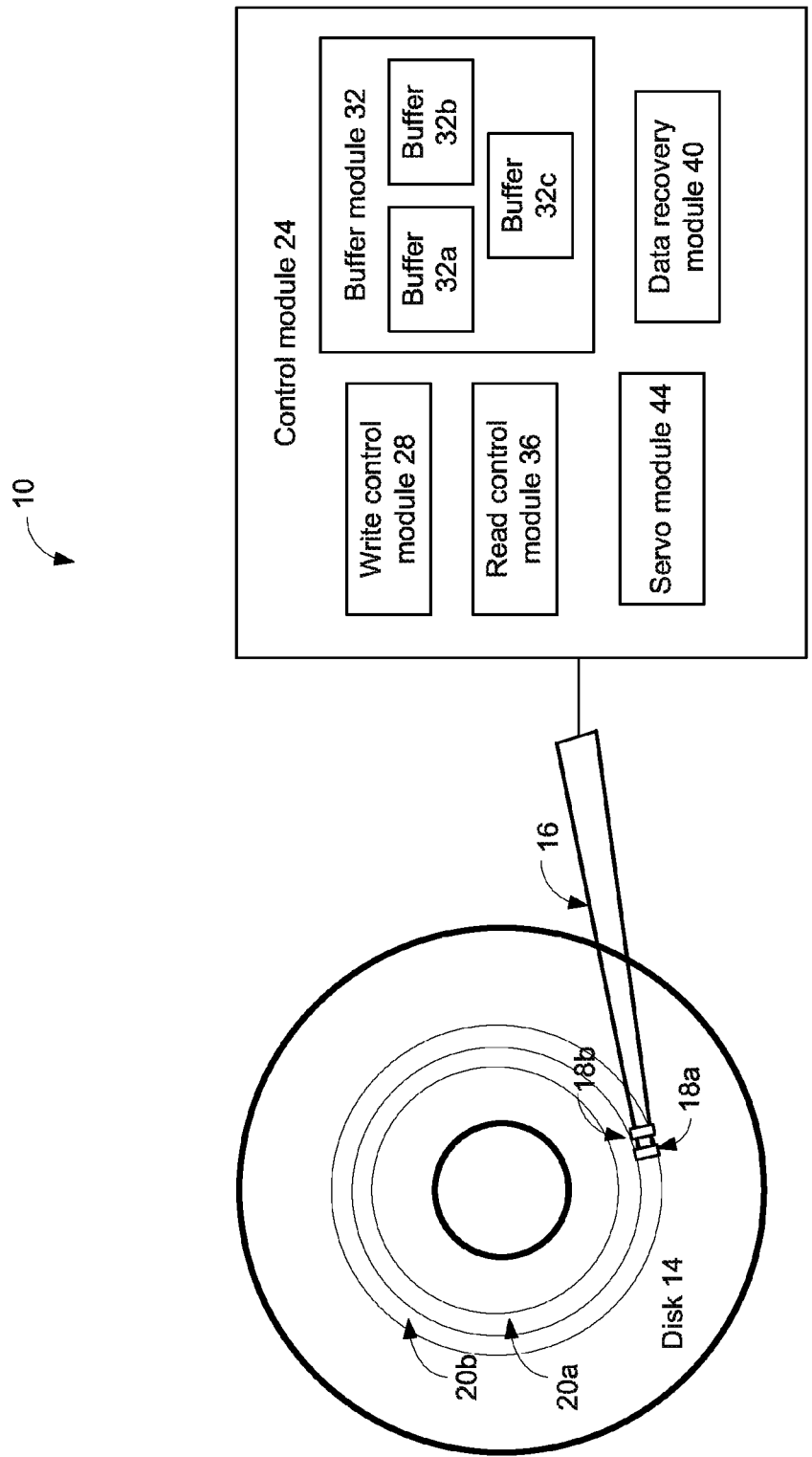
FIG. 1 schematically illustrates an example of a disk drive system.

FIG. 1 schematically illustrates an example of a hard disk drive system 10 (henceforth referred to as "system 10"). The system 10 includes a magnetic disk 14 (henceforth referred to as "disk 14"), an actuator arm assembly 16 and a control module 24. A write head 18a for writing data on the disk 14, and a read head 18b for reading data from the disk 14 are affixed at one end of the actuator arm assembly 16. A plurality of concentric tracks are laid on a surface of the disk 14, in which data is written on by the write head 18a and/or from which data is read by the read head 18b. Only two example tracks 20a and 20b of the plurality of concentric tracks of the disk 14 are illustrated in FIG. 1 for purposes of clarity. Although not illustrated in FIG. 1, in an embodiment, each track comprises a plurality of data storing sectors and a plurality of servo sectors, where each servo sector of the plurality of servo sectors is interleaved between two corresponding data storing sectors.

In an embodiment, the control module 24 comprises a write control module 28, a buffer module 32, a read control module 36, a data recovery module 40 and a servo module 44. The buffer module 32 comprises a buffer 32a, a buffer 32b and a buffer 32c. The control module 24 is communicatively coupled to the write head 18a and the read head 18b. In an embodiment, the control module 24 controls a movement of the actuator arm assembly 16, and controls an alignment of the actuator arm assembly 16 (e.g., alignment of the write head 18a and/or the read head 18b, which are affixed on the actuator arm assembly 16) with respect to a track on which data is scheduled to be written and/or from which data is scheduled to be read. Although not illustrated in FIG. 1, the system 10 may include several other components known to those skilled in the art—e.g., a spin motor to rotate the disk 14, a read channel, a write channel, and so on.

Figure 2:
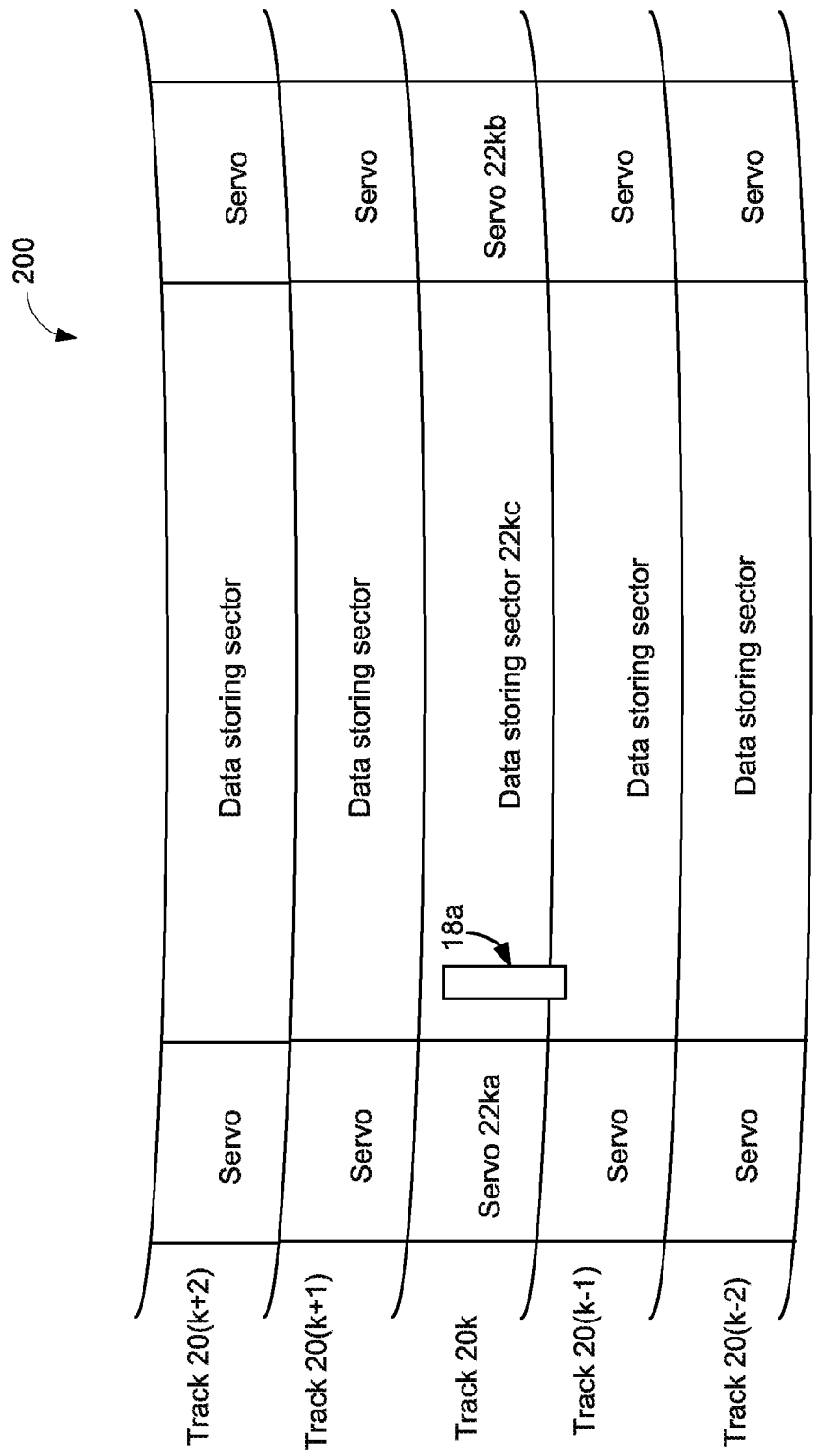
FIG. 2 schematically illustrates a portion of a disk.

FIG. 2 schematically illustrates a portion 200 of the disk 14 of FIG. 1. The portion 200 comprises portions of a plurality of tracks of the disk 14, e.g., portions of tracks 20(k−2), 20(k−1), 20k, 20(k+1), 20(k+2). As illustrated in FIG. 2, the tracks 20(k−2), ..., 20(k+2) are five consecutive tracks of the disk 14. The tracks 20(k−2), ..., 20(k+2) are concentric tracks such that among the five illustrated tracks, the track 20(k+2) is nearest to a center of the disk 14 and the track 20(k−2) is nearest to an edge of the disk 14.

In FIG. 2, the illustrated portion of each of the tracks includes two servo sectors and a data storing sector interleaved between the two servo sectors. For example, the track 20k comprises a data storing sector 22kc interleaved between servo sectors 22ka and 22kb. In an embodiment, data is written on and/or read from the data storing sectors of the tracks. The servo sectors of a track store information about the track, which are used, for example, to align the write head 18a and/or the read head 18b with respect to the track. For example, while writing data on the track 20k, the write head 18a uses data from the servo sectors 22ka, 22kb (and possibly other servo sectors of the track 20k) to align to the track 20k.

FIG. 2 also illustrates the write head 18a, which is somewhat aligned with respect to the track 20k. For example, as illustrated in FIG. 2, the write head 18a is slightly offset with respect to the track 20k, such that at least a portion of the write head 18a infringes on the adjacent track 20(k−1).

Figure 3:
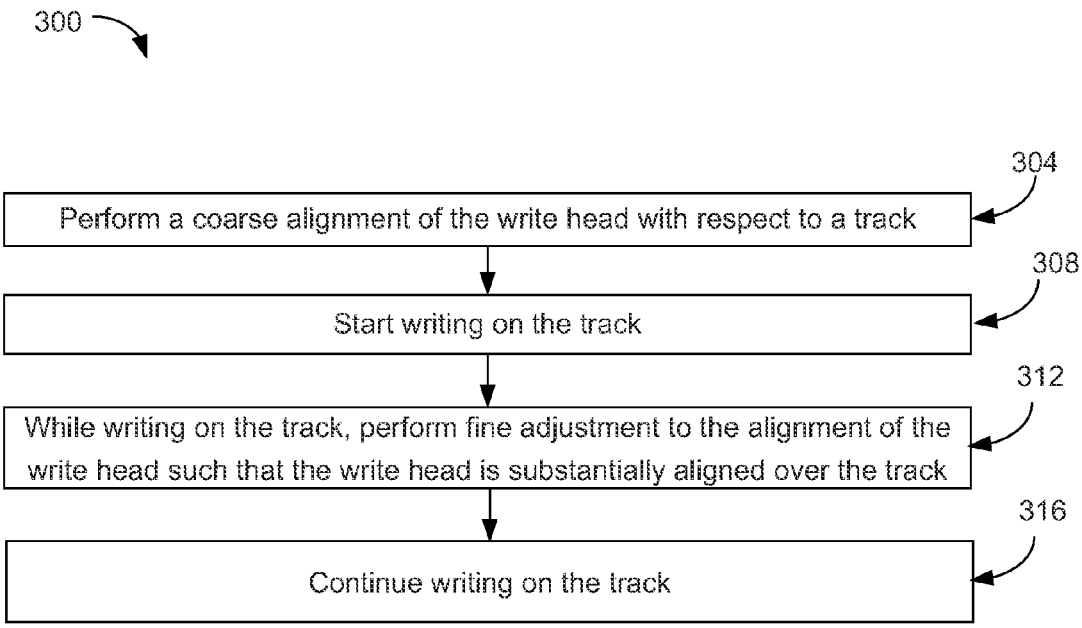
FIG. 3 illustrates an example of a method for writing data on a track of a disk.

FIG. 3 illustrates an example of a method 300 for writing data on a track (e.g., track 20k) of the disk 14 of FIG. 1. In method 300, data is written on the track 20k by the write head 18a. Referring to FIGS. 1-3, at 304, a coarse alignment of the write head 18a is performed (e.g., by the servo module 44 of FIG. 1) with respect to the track 20k. During the coarse alignment of the write head 18a, the write head 18a is somewhat aligned (e.g., but possibly not fully aligned) to the track 20k. For example, FIG. 2 illustrates an example position of the write head 18a after the coarse alignment of the write head 18a. In an embodiment, the coarse alignment is performed by suitably positioning the actuator arm assembly 16 such that the write head 18a is at least somewhat over the track 20k. The coarse alignment is performed based on the write head 18a and/or the read head 18b reading information from one or more servo sectors of the track 20k (and/or one or more servo sectors of other neighboring tracks).

At 308, subsequent to the coarse alignment of the write head 18a to the track 20k, the write head 18a starts writing data on the data storing sectors of the track 20k. While writing data on the track 20k, the write head 18a (and/or the read head 18b) passes over one or more servo sectors of the track 20k (and/or one or more servo sectors of other neighboring tracks). Based on passing over the one or more servo sectors, fine tuning or fine adjustment to the alignment of the write head 18a is performed (e.g., by the servo module 44, by fine tuning the position of the actuator arm assembly 16) at 312, such that the write head 18a is substantially aligned to the track 20k (i.e., the write head 18a no longer infringes on a neighboring track). At 316, the write head 18a continues writing data on the track 20k.

Thus, in method 300, data is written to the track 20k even when the write head 18a is not substantially aligned to the track 20k, e.g., while the write head 18a is slightly offset with respect to the track 20k, such that at least a portion of the write head 18a infringes on the adjacent track 20(k−1), as illustrated in FIG. 2. In an embodiment, due to the infringement of the write head 18a on the adjacent track 20(k−1) while writing data on the track 20k, data stored on the adjacent track 20(k−1) may at least in part be overwritten or corrupted by the write head 18a. That is, at least a part of the data on the track 20(k−1) may be corrupted due to the misalignment of the write head 18a, while writing data on the track 20k at 308 of method 300. This may pose problems while the corrupted data is subsequently read from the track 20(k−1).

For the purpose of this disclosure and unless otherwise mentioned, "infringement" refers to a situation in which, while writing data on a first track (e.g., track 20k), data of an adjacent second track (e.g., track 20(k−1)) is corrupted due to a misalignment of the write head 18a with respect to the first track (e.g., as the write head 18a was slightly offset with respect to the first track, such that at least a portion of the write head 18a infringed on the second track while writing data on the first track). For the purpose of this disclosure and unless otherwise mentioned, "infringing data" refers to the data that was being written on the first track while the infringement occurred, "infringed data" refers to the original data in the second track that is potentially corrupted due to the infringement (i.e., infringed data is the data that was originally stored in the second track before the infringement), "corrupted data" refers to the infringed data that was corrupted due to the infringement (i.e., corrupted data is the data in the second track after infringement), "infringing track" refers to the first track, "infringed track" refers to the second track, and "infringement information" comprises any relevant information associated with the infringement (e.g., information associated with a position of one or more data storing sectors of the infringed track on which the infringement occurred, the infringement data, the corrupted data, and/or the like).

Figure 4A:
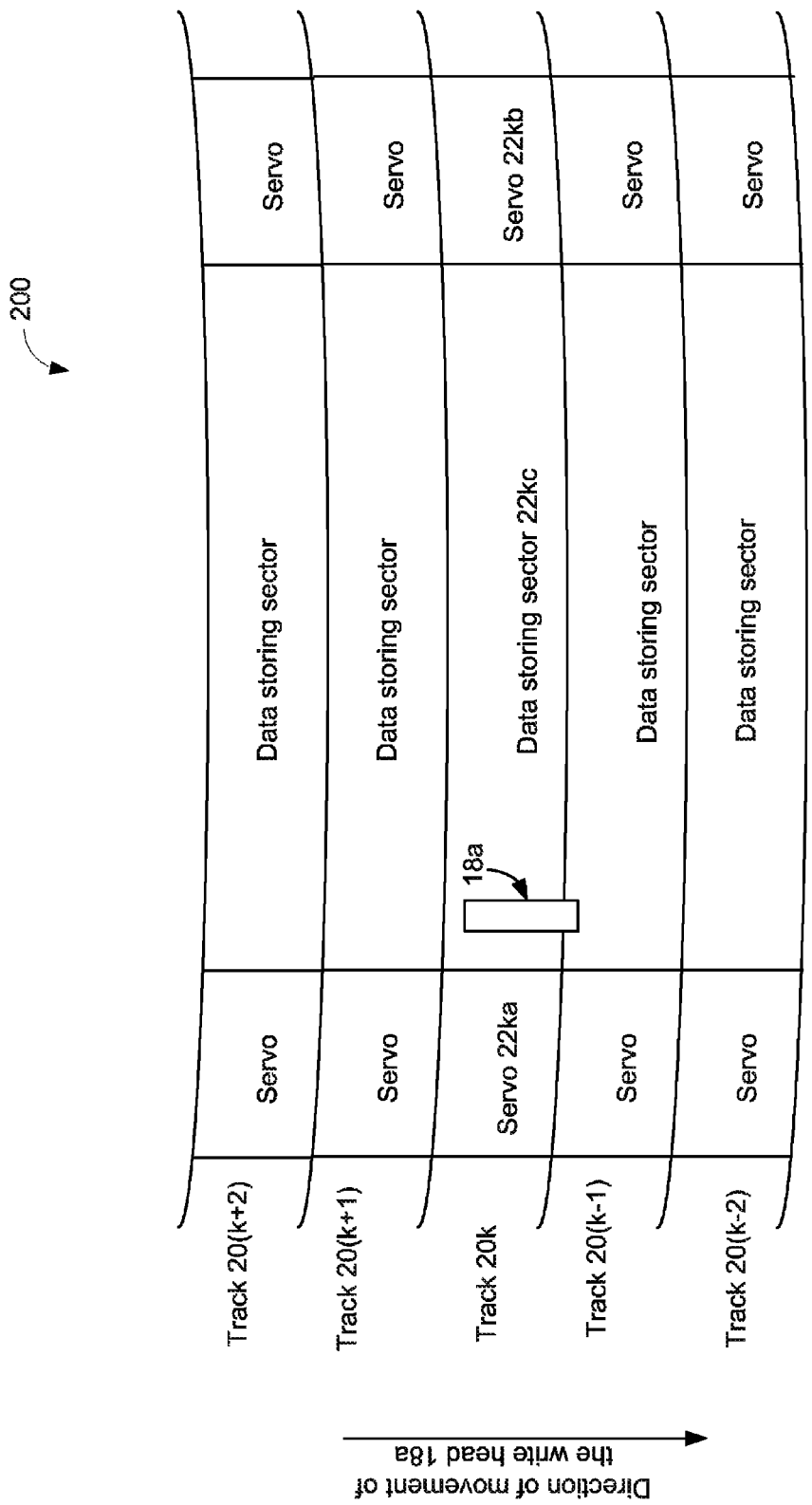
FIGS. 4a and 4b schematically illustrate a portion of a disk, along with corresponding directions of movement of a write head.

FIG. 4a is similar to FIG. 2, with an example direction of movement of the write head 18a added in FIG. 4a. In an embodiment, during a write operation, data is generally written to consecutive tracks of the disk 14. As an example, data is written on the track 20k, followed by writing of data on the track 20(k−1), followed by writing of data on the track 20(k−2), and so on, as illustrated in FIG. 4a. That is, in this example, data is written on a first track, then on a second track that is further from a center of the disk compared to the first track, and so on. FIG. 4a illustrates, using an arrow, an example direction of movement of the write head 18a while writing on different tracks of the disk 14.

Figure 4B:
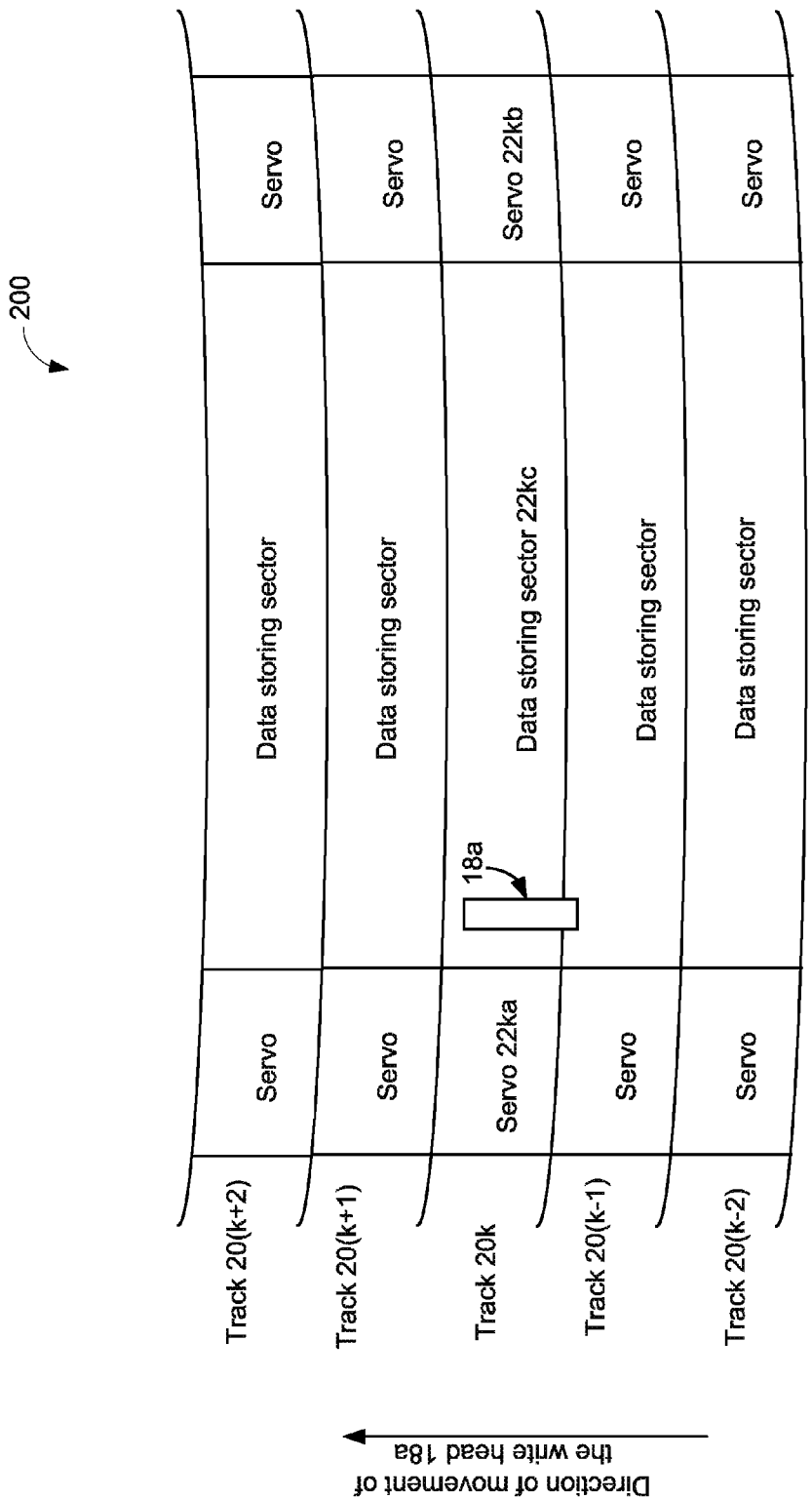

FIG. 4b is similar to FIG. 2, with an example direction of movement of the write head 18a added in FIG. 4b. As another example, data is written on the track 20k, followed by writing of data on the track 20(k+1), followed by writing of data on the track 20(k+2), and so on, as illustrated in FIG. 4b. That is, in this example, data is written on a first track, then on a second track that is nearer to the center of the disk compared to the first track, and so on. FIG. 4b illustrates, using an arrow, another example direction of movement of the write head 18a while writing on different tracks of the disk 14.

Assume that an infringement occurs while writing data on the track 20k. For example, while writing data on the track 20k, data of the adjacent track 20(k−1) is corrupted due to the misalignment of the write head 18a. If the direction of movement of the write head 18a is as illustrated in FIG. 4a, then the corrupted data in the track 20(k−1) will be overwritten subsequent to the writing of data in the track 20k. Accordingly, in this situation, as the corrupted data in the infringed track 20(k−1) will anyway be overwritten by new data, the corruption of the infringed data in infringed track (k−1) will not pose any problem (i.e., the infringement will not create any problem).

However, if the direction of movement of the write head 18a is as illustrated in FIG. 4b, then the corrupted data on the infringed track 20(k−1) will not be overwritten, and there is a possibility that the corrupted data in the infringed track 20(k−1) will be read in future. However, as the data is corrupted on the infringed track 20(k−1), there may be problems reading the corrupted data from the infringed track 20(k−1) in future.

Figure 5:
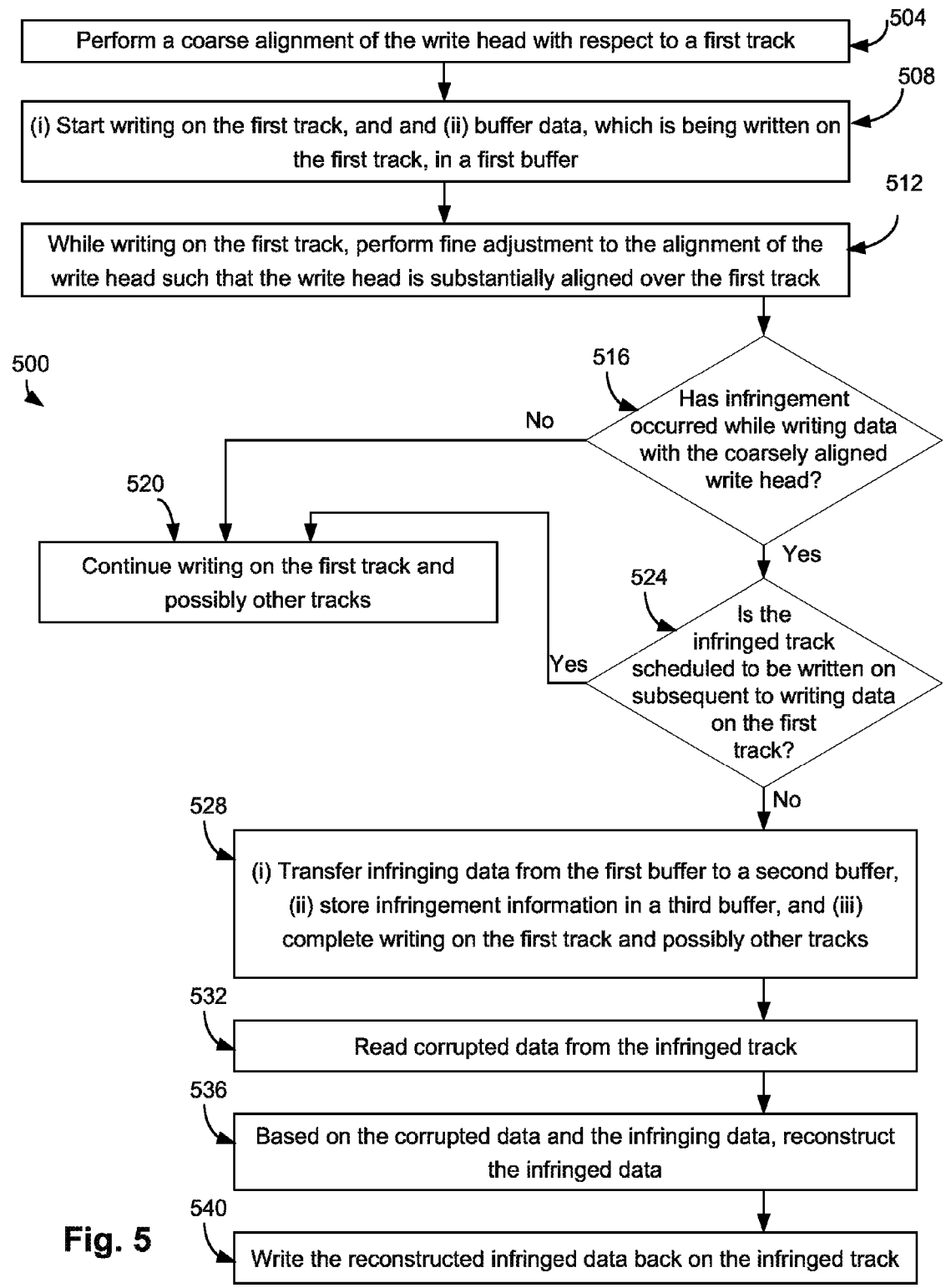
FIG. 5 illustrates another example of a method for writing data on a track of a disk.

FIG. 5 illustrates another example of a method 500 for writing data on a track of the disk 14 of FIG. 1. In method 500, data is written on a first track (e.g., track 20k) by the write head 18a. Referring to FIGS. 1, 2 and 5, at 504, a coarse alignment of the write head 18a is performed (e.g., by the servo module 44) with respect to the first track. During the coarse alignment of the write head 18a, the write head 18a is somewhat aligned (e.g., but possibly not fully aligned) to the first track, e.g., as illustrated in FIG. 2.

At 508, subsequent to the coarse alignment of the write head 18a to the first track, the write head 18a starts writing data on the data storing sectors of the first track. In an embodiment, at 508, data, which is being written on the first track, is buffered (e.g., by the buffer module 32) in a first buffer (e.g., buffer 32a). Although FIG. 5 illustrates the data being buffered concurrently with starting to write the data on the first track, in various other embodiments, the buffering of the data is performed (i) prior to or while performing the coarse alignment of the write head 18a, (ii) prior to, while, or subsequent to writing the data on the first track, and/or during any other suitable time period.

After starting to write on the first track at 508, the write head 18a (and/or the read head 18b) passes over one or more servo sectors of the first track (and/or one or more servo sectors of one or more neighboring tracks). Based on passing over the one or more servo sectors, fine adjustment to the alignment of the write head 18a is performed (e.g., by the servo module 44) at 512, such that the write head 18a is substantially aligned to the first track.

At 516, the controller 24 (e.g., the servo module 44) determines if an infringement has occurred while writing data on the first track with the coarsely aligned write head 18a at 508. In an embodiment, such determination may be made based on information received from the one or more servo sectors while performing the fine adjustment of the write head 18a at 512.

If no infringement is detected at 516 (i.e., if "no" at 516), then at 520 writing of data in the first track and/or possible writing of data in one or more other tracks is continued.

If an infringement is detected at 516 (i.e., if "yes" at 516), then the control module 24 (e.g., the data recovery module 40 and/or the servo module 44) identifies the infringed track, which is, for example, a track adjacent to the first track. In an example, the track 20(k−1) is the infringed track, as illustrated in FIGS. 2, 4a and 4b. At 524, the control module 24 (e.g., the data recovery module 40 and/or the servo module 44) further determines if the infringed track is scheduled to be written on subsequent to writing data on the first track. Such determination is based, for example, on a direction of movement of the write head 18a, as illustrated in FIGS. 4a and 4b. For example, if the write head 18a moves in the direction illustrated in FIG. 4a, then the infringed track 20(k−1) is scheduled to be written on subsequent to writing data on the first track 20k. In another example, if the write head 18a moves in the direction illustrated in FIG. 4b, then the infringed track 20(k−1) is not scheduled to be written on subsequent to writing data on the first track 20k.

If the infringed track is scheduled to be written on subsequent to writing data on the first track (i.e., if "yes" at 524), then method 500 continues to 520, as illustrated in FIG. 5. That is, if the infringed track is scheduled to be written on subsequent to writing data on the first track, then method 500 continues without taking any action for the infringement (e.g., as the corrupted data in the infringed track would shortly be overwritten without ever being read, and the corruption of the infringed data would not pose any problem).

If the infringed track is not scheduled to be written on subsequent to writing data on the first track (i.e., if "no" at 524), then method 500 continues to 528. At 528, the control module 24 (e.g., the buffer module 32 and/or the data recovery module 40) transfers the infringing data (i.e., data being written on the first track) from the first buffer (e.g., which was buffered in the first buffer at 508) to a second buffer (e.g., the buffer 32b of FIG. 1).

In an embodiment, the first buffer (e.g., the buffer 32a) operates on a first-in first-out (FIFO) basis. For example, the buffer 32a buffers data (e.g., at 508) written on the last few tracks (or last few data storing sectors of one or more tracks, on which data is written by the write head 18a). As the system 10 writes on new tracks and/or new data storing sectors of the new tracks, old data in the buffer 32a is replaced by new data corresponding to the new tracks and/or new data storing sectors of the new tracks. If an infringement is detected, the infringing data corresponding to the infringement is transferred from the buffer 32a to the buffer 32b (e.g., at 528 of method 500). The transfer of the infringing data ensures, for example, that the infringing data is available for recovering the infringed data at a later stage (as discussed herein below). Accordingly, the buffer 32a acts as a temporary storage of potential infringing data on a FIFO basis, and the buffer 32b acts as a relatively long term storage for data that has been identified (e.g., identified at 516 and 524 of method 500) as infringing data (e.g., to recover the infringed data from the infringing data at a later stage).

Referring again to FIG. 5, at 528, the control module 24 (e.g., the data recovery module 40) also stores infringement information in a third buffer (e.g., the buffer 32c). For example, the control module 24 stores location information of one or more data storing sectors of the infringed track, in which the infringement occurred (i.e., the one or more data storing sectors of the infringed track, data of which is possibly corrupted by the infringing data). At 528, subsequent to, concurrently with and/or independent of the transfer and the store operations, the write head 18a continues writing data on the first track (and writing data possibly on one or more other tracks, if desired).

After the write head 18a completes the write operation (e.g., subsequent to completing writing on the first track and possibly on one or more other tracks), at 532, the read head 18b reads the corrupted data from the infringed track, e.g., based on the infringement information buffered in the third buffer. In an embodiment, instead of reading data from the entire infringed track, the read head 18b reads the corrupted data from only those data storing sectors of the infringed track, which were associated with the infringement (e.g., based on the infringement information buffered in the third buffer). In another embodiment, the read head 18b reads data from all the data storing sectors of the infringed track.

The data recovery module 40 receives (i) the corrupted data read at 532 from the infringed track, and (ii) the infringing data from the second buffer. At 536, based on the corrupted data and the infringing data, the data recovery module 40 reconstructs the infringed data (i.e., data that was originally stored in the infringed track before the infringement), e.g., by performing an inter-track inter-symbol cancellation. For example, the data recovery compares the corrupted data and the infringing data (e.g., subtracts the infringing data from the corrupted data) to reconstruct the infringed data.

U.S. patent application Ser. No. 12/882,802 filed Sep. 15, 2010, which is co-pending with the current disclosure, discusses an example method for reconstructing the infringed data from (i) the corrupted data and (ii) the infringing data. U.S. patent application Ser. No. 12/882,802 is hereby incorporated by reference in its entirety except for those sections, if any, that are inconsistent with this disclosure.

At 540, the write head 18a writes the reconstructed infringed data back on the infringed track. In an embodiment, the write head 18a writes the infringed data back on only those data storing sectors of the infringed track, which were affected by the infringement. In another embodiment, the write head 18a writes the infringed data back on the entire infringed track.

In an embodiment and as discussed with respect to method 500, once an infringement is detected while writing on a track, the system 10 does not stop writing on the track to recover the infringed data. Rather, the system 10 continues with the write operation and stores the infringing data in the first and/or second buffers. Once the write operation is complete, the recovery of the infringed data can be performed while, for example, the system 10 waits for a new command from a host computing device (e.g., while the system 10 is otherwise idle).

There are several advantages of the system 10 over a conventional disk drive system. For example, the system 10 can start writing on a track as soon as a coarse alignment of the write head 18a is complete. In contrast, a conventional disk drive system may start writing data on a track only after the write head is substantially aligned to the track. Thus, write operation in the system 10 is substantially faster than a conventional disk drive system. Furthermore, the system 10 effectively recovers infringed data in case of an infringement. Such recovery of the infringed data is performed after completion of a write operation, e.g., while the system 10 waits for a new command (e.g., while the system 10 is idle). Thus, the recovery of the infringed data does not hold up any write and/or read operation of the system 10. Also, a track width of the tracks of the disk 14 of the system 10 can be reduced, as the system 10 is equipped to handle possible infringements due to the reduction of the track width. Thus, a storage density of the disk 14 may be higher than storage density of a disk of a conventional disk drive system.

Although FIG. 1 illustrates (and method 500 refers to) three buffers 32a, 32b and 32c, in an embodiment, a single buffer (or two buffers) may be used in the system 10 (e.g., with a first portion of the buffer allocated for buffering data that is being written on a track, a second portion allocated for buffering infringing data, and a third portion allocated for buffering infringement information).

Although FIG. 1 illustrates (and method 500 refers to) three buffers 32a, 32b and 32c, in an embodiment, a single buffer (e.g., a single circular buffer) may be used in the system 10 (e.g., instead of the three buffers 32a, 32b and 32c). In an embodiment, the single buffer buffers data written most recently in one or more tracks, and automatically replace them with data written in newer tracks if there is no infringement. If an infringement is detected, the control module 24 (e.g., the data recovery module 40) directly uses the infringing data from the single buffer for performing operations at 536 of the method 500. In such an embodiment, for example, the transfer and store operations of 528 of the method 500 are redundant and are not performed.

As previously discussed, movement of the write head 18a usually occurs in one direction while writing on a plurality of consecutive tracks. For example, FIGS. 4a and 4b illustrate two possible directions of movement of the write head 18a. Also, as discussed with respect to method 500, if an infringed track is scheduled to be written on subsequent to writing data on a infringing track, then the write operation can continue without trying to recover the infringed data and/or rewrite the infringed data on the infringed track (e.g., as the corrupted data in the infringed track would shortly be overwritten without ever being read). In an embodiment, while writing data on a first track, a coarse alignment of the write head 18a can be performed such that infringement occurs with a higher probability on a second track on which data is scheduled to be written subsequent to writing the data on the first track.

Figure 6:
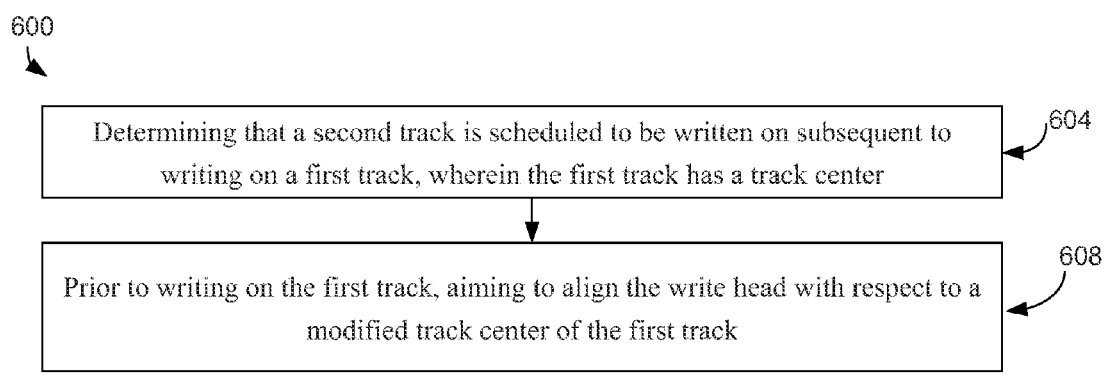
FIG. 6 illustrates an example of a method for aligning a write head with respect to a track of a disk.

FIG. 6 illustrates an example of a method 600 for aligning the write head 18a with respect to a track of the disk 14 of FIG. 1. Referring to FIG. 6, prior to writing on a first track (e.g., track 20k), at 604, the write control module 28 determines that a second track (e.g., the track 20(k−1)) is scheduled to be written on subsequent to writing data on the first track. The second track is, for example, adjacent to the first track. In an embodiment, the first track has a track center (e.g., which runs along a center of the first track, and which may be used to align the write head 18a).

Based on determining that the second track is scheduled to be written on subsequent to writing on the first track, at 608, the write head 18a is aimed to be aligned (e.g., while performing a coarse alignment of the write head 18a) with respect to a modified track center of the first track, prior to writing data on the first track. As an example, the servo sectors of the first track, the actuator arm assembly 16 and/or the servo module 44 can be configured to try to align the write head 18a in such a manner. In an embodiment, the second track is at a first direction with respect to the first track, and the modified track center is offset with respect to the track center in the first direction.

Figure 7:
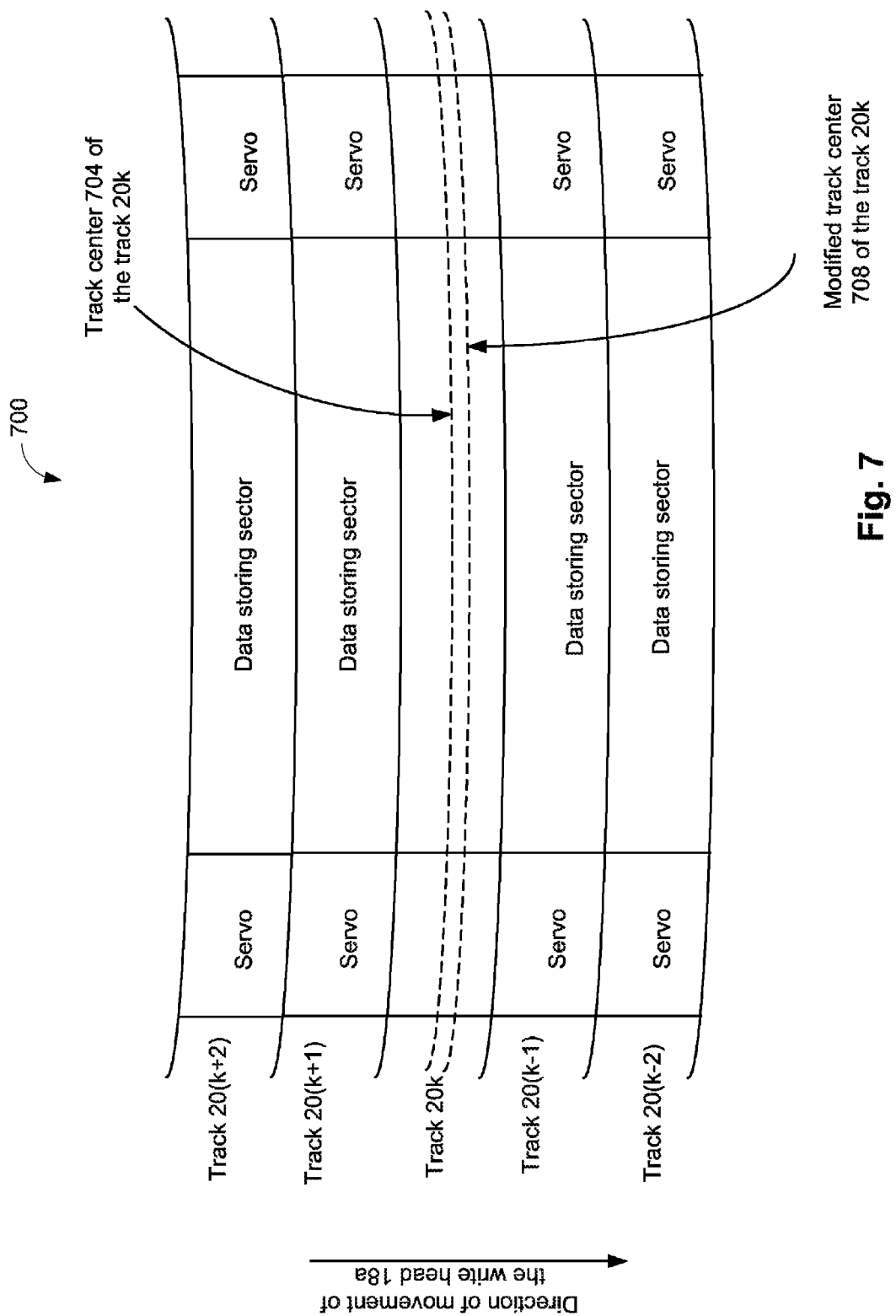
FIG. 7 schematically illustrates a portion of a disk, along with a track center and a modified track center of a track of the disk.

FIG. 7 schematically illustrates a portion 700 of the disk 14, which is similar to the portion 200 of FIG. 2. FIG. 7 also illustrates an example direction of movement of the write head 18a, which is similar to the direction of movement of the write head 18a in FIG. 4a. Referring to FIGS. 6 and 7, before writing data on the track 20k, the direction of movement of the write head 18a is determined (i.e., it is determined that track 20(k−1) will be written on, subsequent to writing on the track 20k). Based on such a determination, the alignment of the write head 18a is performed with respect to a modified track center 708 of the track 20k, where the modified track center 708 is offset with respect to a track center 704 (e.g., the original or physical track center of the track 20k) in the direction of the track 20(k−1), as illustrated in FIG. 7. In an embodiment, trying to align the write head 18a with respect to the modified track center 708 (e.g., instead of the track center 704) increases a probability of the track 20(k−1) (e.g., instead of the track 20(k+1)) being the infringed track while writing data on the track 20k. That is, due to the above discussed alignment of the write head 18a to the track 20k, a probability of the track 20(k−1) being the infringed track is higher than a probability of the track 20(k+1) being the infringed track. As track 20(k−1) is going to be overwritten by the write head 18a subsequent to writing on the track 20k, an infringement on the track (k−1) will not adversely affect the performance of the system 10 (compared to a situation where the track 20(k+1) is the infringing track).

In an embodiment, the offset between the track center 704 and the modified track center 708 is based on a variety of factors. For example, the offset has to be large enough to have a relatively higher probability of the track 20(k−1) being the infringing track during the coarse alignment of the write head 18a (e.g., compared to the probability of the track 20(k+1) being the infringing track). On the other hand, if the offset is too large, then the write head 18a will have relatively large misalignment with respect to the track 20k, thereby decreasing a quality of write data on the track 20k. Accordingly, a balance between these two factors may be maintained while determining the amount of the offset.

In accordance with an embodiment, an article of manufacture may be provided that includes a storage medium having instructions stored thereon that, if executed, result in the operations described herein with respect to methods 300, 500 and/or 600 of FIGS. 3, 5 and/or 6 (and/or various other operations discussed in the present disclosure). In an embodiment, the instructions, if executed, result in the operations performed by the system 10 of FIG. 1. In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the terms "embodiment" or "embodiments," which may each refer to one or more of the same or different embodiments. Furthermore, the terms "comprising," "including," "having," and the like, as used with respect to embodiments, are synonymous.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising:
    causing data to be written on a first track located on a disk;
    while writing the data on the first track, buffering, in a buffer module, the data;
    determining that while writing the data on at least a portion of the first track, a portion of a write head was offset with respect to the first track, such that at least the portion of the write head infringed on a second track;
    determining a direction of movement of the write head; and
    based on determining that the portion of the write head was offset and determining the direction of movement of the write head, selectively performing one of (i) using the data buffered in the buffer module to recover data of the second track, or (ii) discarding the data buffered in the buffer module.

2. The method of claim 1, wherein the data to be written on the first track is first data, and wherein the method further comprises:
    based on determining the direction of movement of the write head, determining that the write head is not scheduled to write on the second track subsequent to writing the first data on the first track; and
    based on determining that the write head is not scheduled to write on the second track subsequent to writing the first data on the first track,
        reading second data from the second track,
        based on the first data and the second data, generating third data, and
        writing the third data on the second track.

3. The method of claim 2, wherein the second data is corrupted data, wherein the corrupted data was corrupted due to at least the portion of the write head infringing on the second track while writing the first data on at least the portion of the first track.

4. The method of claim 2, wherein generating the third data comprises:
   subtracting the first data from the second data to generate the third data.

5. The method of claim 2, wherein:
   buffering the first data comprises buffering the first data in a first buffer of the buffer module;
   the method further comprises, based on determining that the write head will not write on the second track subsequent to writing the first data on the first track, transferring the first data from the first buffer to a second buffer of the buffer module; and
   the generating the third data further comprises, based on the first data received from the second buffer, generating the third data.

6. The method of claim 2, wherein:
   the method further comprises based on determining that the write head is not scheduled to write on the second track subsequent to writing the first data on the first track, buffering location information of the second track in the buffer module; and
   the reading the second data from the second track further comprises:
      reading the location information of the second track from the buffer module, and
      based on reading the location information of the second track, reading the second data from the second track.

7. The method of claim 2, wherein the third data was originally stored on the second track prior to writing the first data on the first track.

8. A control module comprising:
   a buffer module, wherein based on a write head writing data on a first track of a disk, the buffer module is configured to buffer the data;
   a servo module configured to determine that while writing the data on at least a portion of the first track, a portion of the write head was offset with respect to the first track, such that at least the portion of the write head infringed on a second track of the disk, wherein the servo module is further configured to determine a direction of movement of the write head; and
   a data recovery module configured to, based on the direction of movement of the write head, selectively perform one of (i) using the data buffered in the buffer module to recover data of the second track, or (ii) discarding the data buffered in the buffer module.

9. The control module of claim 8, wherein the data written on the first track is first data, and wherein the data recovery module is further configured to:
   based on the direction of movement of the write head, determine that the write head is not scheduled to write on the second track subsequent to writing the first data on the first track;
   based on determining that the write head is not scheduled to write on the second track subsequent to writing the first data on the first track, read second data from the second track;
   based on the first data and the second data, generate third data; and
   write the third data on the second track.

10. The control module of claim 9, wherein the second data is corrupted data, wherein the corrupted data was corrupted due to at least the portion of the write head infringing on the second track while writing the first data on at least the portion of the first track.

11. The control module of claim 9, wherein the data recovery module is further configured to generate the third data by subtracting the first data from the second data.

12. The control module of claim 9, wherein the buffer module is further configured to:
   based on the write head writing the first data on the first track, buffer the first data in a first buffer included in the buffer module; and
   based on determining that the write head is not scheduled to write on the second track subsequent to writing the first data on the first track, transfer the first data from the first buffer to a second buffer included in the buffer module,
   wherein the data recovery module is configured to generate the third data, based on the first data received from the second buffer.

13. The control module of claim 9, wherein the buffer module is further configured to:
   based on the write head writing the first data on the first track, buffer the first data in a first buffer included in the buffer module; and
   based on determining that the write head is not scheduled to write on the second track subsequent to writing the first data on the first track, buffer location information of the second track in a second buffer included in the buffer module,
   wherein the data recovery module is configured to read the second data from the second track by:
      reading the location information of the second track from the second buffer, and
      based on reading the location information of the second track from the second buffer, reading the second data from the second track.

14. The control module of claim 9, wherein the third data was originally stored on the second track prior to writing the first data on the first track by the write head.

15. The control module of claim 8, wherein:
   the control module is coupled to a host computing device; and
   the control module is configured to receive the first data from the host computing device.

16. A method comprising:
   aiming to align a write head with a first track for writing data on the first track, wherein the first track has a track center, wherein a second track of the disk is adjacent to the first track; and
   responsive to determining that data is scheduled to be written on a second track of the disk subsequent to the writing of data on the first track in which the second track is adjacent to the first track in a first direction, aiming to align the write head at a first position along the first track, wherein the first position is offset with respect to the center of the first track in the first direction.

17. The method of claim 16, further comprising:
   while aiming to align the write head at a first position along the first track, writing first data on the first track;
   buffering the first data in a buffer;
   determining that while writing the first data on at least a portion of the first track, a portion of the write head was offset with respect to the first track such that at least the portion of the write head infringed on the second track; and
   based on (i) determining that the portion of the write head was offset with respect to the first track such that at least the portion of the write head infringed on the second track and (ii) determining that data is scheduled to be written on the second track subsequent to the writing on the first track, discarding the first data buffered in the buffer.

18. The method of claim 16, further comprising:
based on determining that data is scheduled to be written on the second track subsequent to the writing on the first track, identifying the modified track center of the first track such that the modified track center of the first track is offset with respect to the track center in the first direction.

* * * * *